United States Patent [19]

Ampferer

[11] Patent Number: 4,510,898

[45] Date of Patent: Apr. 16, 1985

[54] RECIPROCATING PISTON INTERNAL COMBUSTION ENGINE, PREFERABLY OF FOUR-CYLINDER CONSTRUCTION

[75] Inventor: Herbert Ampferer, Bietigheim-Bissingen, Fed. Rep. of Germany

[73] Assignee: Dr. Ing. h.c.f. Porsche AG, Fed. Rep. of Germany

[21] Appl. No.: 424,372

[22] Filed: Sep. 27, 1982

[30] Foreign Application Priority Data

Sep. 25, 1981 [DE] Fed. Rep. of Germany ....... 3138165

[51] Int. Cl.$^3$ .............................................. F16F 15/26

[52] U.S. Cl. ................................ 123/192 R; 411/366; 411/389; 411/426

[58] Field of Search ........................ 123/192 R, 192 B; 74/603, 604; 411/366, 429, 426, 424, 411, 389

[56] References Cited

U.S. PATENT DOCUMENTS 3,245,142 4/1966 Williams ............................. 411/366

FOREIGN PATENT DOCUMENTS 2935384 3/1981 Fed. Rep. of Germany ........ 74/603

47-16882 10/1972 Japan .................................. 411/424

*Primary Examiner*—Ira S. Lazarus

*Assistant Examiner*—R. S. Bailey

*Attorney, Agent, or Firm*—Craig and Burns

[57] ABSTRACT

A reciprocating piston internal combustion engine equipped with a vibration-damping balancing shaft that is rotatably supported in a bearing housing which in turn is secured at the cylinder crankcase by means of a threaded connection; in order to support the rotational forces of the balancing shaft between bearing housing and cylinder housing without play, at least one of the bolts of the threaded connection includes a conically shaped neck that cooperates with a corresponding chamfering in the bearing housing.

5 Claims, 3 Drawing Figures

RECIPROCATING PISTON INTERNAL COMBUSTION ENGINE, PREFERABLY OF FOUR-CYLINDER CONSTRUCTION

The present invention relates to a reciprocating piston internal combustion engine, preferably of four-cylinder design, with at least one vibration-damping balancing shaft, which is rotatably supported in a bearing housing retained at the crankcase by means of a threaded connection. Balancing shafts are generally known and it has been proposed, by a nonpublished Swedish patent application No. 8103814, which corresponds to German Offenlegungsschrift No. 3221968, to connect the bearing housing of the balancing shaft by means of normal bolts acting primarily in the axial direction. Such bolts are not suited for the fastening of the bearing housing of the balancing shaft since no measures are made in the same in order to support the forces which occur in particular in the upper rotational speed range and which act transversely to the bolt axis.

According to a further proposal of the aforementioned nonpublished Swedish patent application, a support between bearing housing and crankcase is to be achieved in that cheeks of the bearing housing are supported at walls of a recess in the crankcase. Not only the high manufacturing costs for the cheeks and the recess are disadvantageous with such construction, but also an effective transverse force support is realizable only with great difficulty by reason of the manufacturing tolerances which cannot be avoided.

It is the aim of the present invention to so fasten the bearing housing of the balancing shaft at the crankcase that the rotating mass forces are supported functionally correct while avoiding costly measures from a manufacturing point of view.

The underlying problems are solved according to the present invention in that at least one bolt, respectively bolt nut of the threaded connection has a conically shaped neck which cooperates with a corresponding chamfering of the bearing housing.

The advantages principally achieved with the present invention reside in that the conically shaped neck of the bolt, respectively of the bolt nut and the chamfering at the bearing housing functionally correctly support the occurring forces which act transversely to the bolt axis. The stud bolt includes for purposes of support a conically shaped neck cooperating with a chamfering of the crankcase, whence notch effects are kept away from the threaded pin of the stud bolt.

These and other objects, features and advantages of the present invention will become more apparent from the following description when taken in connection with the accompanying drawing which shows, for purposes of illustration only, two embodiments in accordance with the present invention, and wherein.

Figure 1:
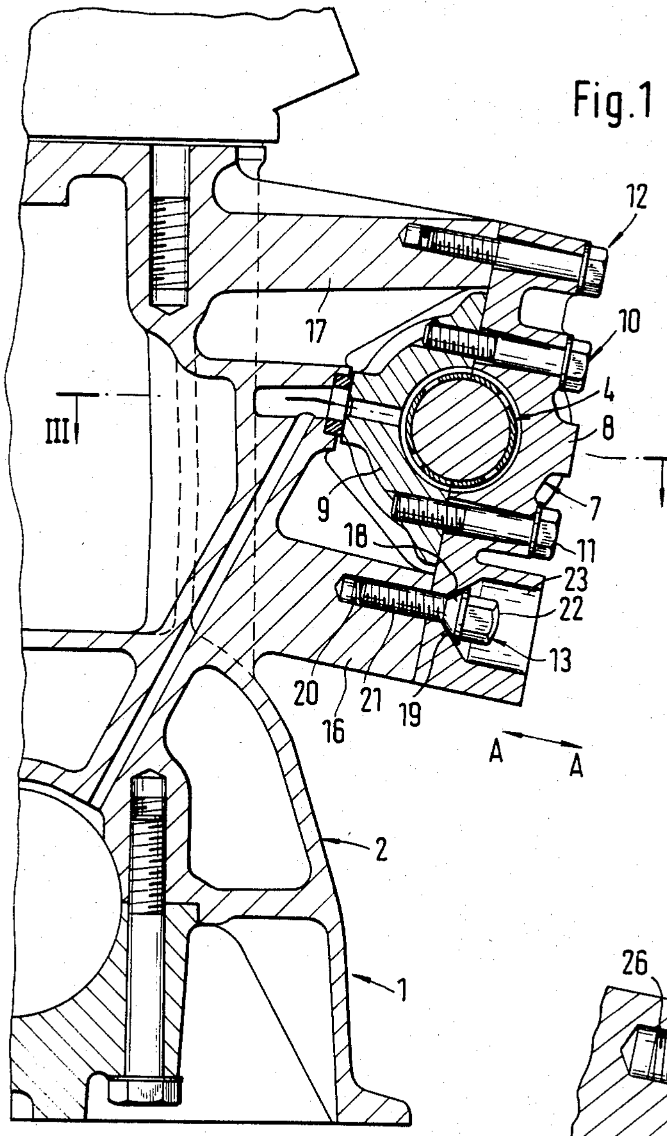
FIG. 1 is a partial cross-sectional view of a reciprocating piston internal combustion engine with a bolted connection according to the present invention.

Referring now to the drawing wherein like reference numerals are used throughout the various views to designate like parts, a reciprocating piston internal combustion engine generally designated by reference numeral 1 includes a cylinder crankcase generally designated by reference numeral 2, along the longitudinal side 3 of which (FIG. 3) extends a balancing shaft generally designated by reference numeral 4 which serves for the vibration-damping (mass or inertia forces, gas forces).

The balancing shaft 4 includes balancing weights 5 and 6 and rotates with twice the crankshaft rotational speed in a bearing housing generally designated by reference numeral 7 which is formed by two housing halves 8 and 9. The housing halves 8 and 9 are held in position by means of bolts generally designated by reference numerals 10 and 11 (FIG. 1).

Figure 3:
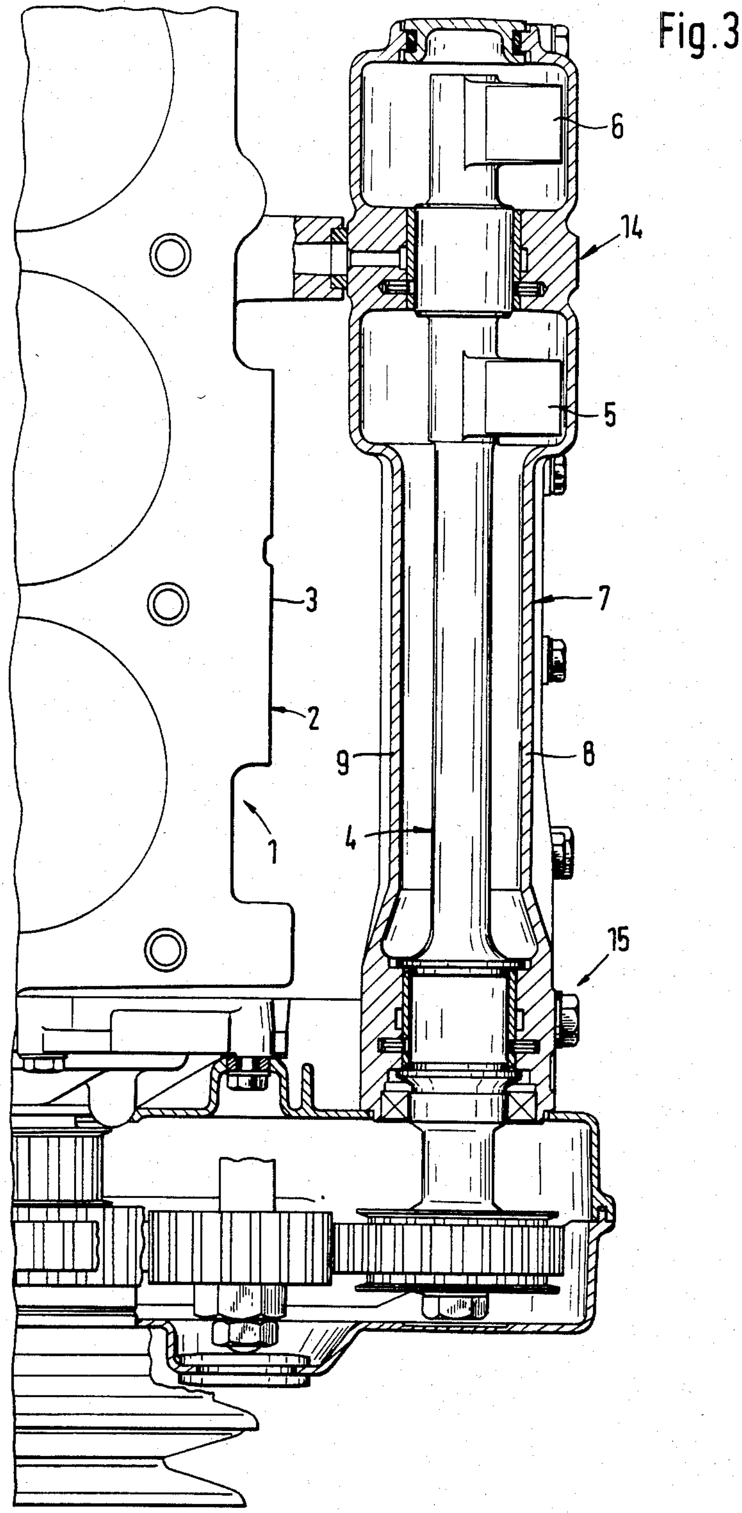
FIG. 3 is a cross-sectional view taken along line III—III of FIG. 1.

The mounting of the bearing housing 7 also takes place by means of bolts generally designated by reference numerals 12 and 13 (FIG. 1) arranged at a distance to one another which are provided at 14 and 15 (FIG. 3). Fastening sections 16 and 17 (FIG. 1) are provided at the cylinder crankcase 2 for the accommodation and positioning of the bearing housing 7.

The bolt 12 (at 14) as well as the bolts (not shown) at 15 are formed by conventional hexagonal bolts. In contrast thereto, the bolt 13 includes a conically shaped neck 18 which cooperates with a corresponding chamfering 19 of the bearing housing 7 in such a manner that the occurring forces that act transversely to the longitudinal axis A—A of the bolt 13, can be supported without play. In order to avoid redundancy in determination, it suffices to construct solely a single bolt in this manner.

The bolt 13 includes a threaded shank portion 21 projecting into a threaded bore 20 and of a head 22 which is accessible by way of an aperture 23 in the bearing housing 7.

Figure 2:
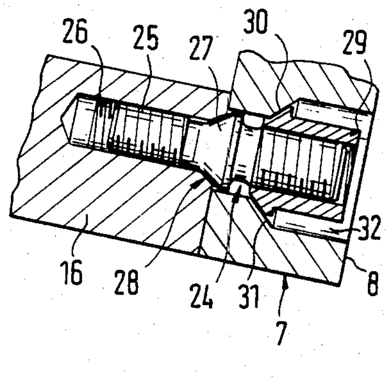
FIG. 2 is a partial elevational view of FIG. 1, on an enlarged scale, and illustrating a different embodiment.

According to FIG. 2, the bolt is formed by a stud bolt generally designated by reference numeral 24 whose threaded shank portion 25 is screwed into a threaded bore 26. The threaded stud bolt 25 is supported by means of a conically shaped neck 27 at a corresponding chamfering 28 of the cylinder crankcase 2, whereby forces acting on the threaded portion 23 are appropriately braced.

A bolt nut 29 (FIG. 2) of the stud bolt 22 includes a conically shaped neck 30 which cooperates with a corresponding chamfering 31 of the bearing housing 7. The bolt nut 29 is accessible by way of an aperture 32 in the bearing housing 7.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A reciprocating piston internal combustion engine with a cylinder crankcase comprising at least one balancing shaft means for damping of vibration rotatably supported by a bearing housing retained relative to a cylinder crankcase by a threaded connection means, at least one part of the threaded connection means being a bolt, said bolt being a stud bolt which is connected with a bolt nut having the conically shaped neck cooperating with a corresponding chamfered area of one of the bearing housing and crankcase.

2. A reciprocating piston internal combustion engine according to claim 1, wherein a threaded portion of the stud bolt includes a conically shaped neck which is supported at a chamfered area of the cylinder crankcase.

3. A reciprocating piston internal combustion engine according to claim 1, wherein the neck and chamfered area have rounded-off surfaces.

4. A reciprocating piston internal combustion engine with a cylinder crankcase comprising at least one balancing shaft means for damping of vibration rotatably supported by a bearing housing retained relative to a cylinder crankcase by a threaded connection means, at least one part of the threaded connection means being a bolt nut and including a conically shaped neck cooperating with a corresponding chamfered area of one of the bearing housing and crankcase.

5. A reciprocating piston internal combustion engine according to claim 1, wherein the neck and the chambered area have rounded-off surfaces.

* * * * *